United States Patent [19]

Shou et al.

[11] Patent Number: 5,363,205
[45] Date of Patent: Nov. 8, 1994

[54] IMAGE COMPRESSING METHOD COMPRESSING AN IMAGE INTO A COMPRESSED IMAGE AND ERROR COEFFICIENTS

[75] Inventors: Guoliang Shou; Sunao Takatori; Makoto Yamamoto, all of Tokyo, Japan

[73] Assignee: Yozan Inc., Tokyo, Japan

[21] Appl. No.: 105,058

[22] Filed: Aug. 12, 1993

[30] Foreign Application Priority Data

Aug. 13, 1992 [JP] Japan .................... 4-237687

[51] Int. Cl.$^5$ .................... H04N 1/415; H04N 1/417; H04N 7/13
[52] U.S. Cl. .................... 358/429; 358/433; 348/390; 348/409; 348/420; 348/421; 382/56
[58] Field of Search ............... 358/426, 429, 433, 133, 358/430; 382/52, 56; 395/114; 348/384, 390, 409, 420, 421

[56] References Cited

U.S. PATENT DOCUMENTS 4,268,861  5/1981  Schreiber et al. .
5,020,120  5/1991  Weldy .

OTHER PUBLICATIONS

Kou-Hu Tzou, "Progressive image transmission: a review and comparison of techniques", Optical Engineering, vol. 26, No. 7, Jul. 1987, pp. 581-589; see Section 4.1 on pp. 585-587, FIG. 8.

Hampel, H. et al., "Technical features of the JBIG standard for progressive bi-level image compression", Signal Processing: Image Communication, vol. 4, No. 2, Apr. 1992; see p. 106, right col., line 9-p. 108, left column, line 38; FIGS. 2, 3, 4.

Sanz, A. et al., "Analysis of predicting schemes in pyramidal image coding", ICASSP '89-Int. Conf. on Acoustics, Speech, and Signal Processing 1989; vol. 3, May 23, 1989, IEEE, pp. 1965-1968, see pp. 1966-1967, sections 2 and 3.

Wang, L. et al. "Reduced-difference pyramid: a data structure for progressive image transmission", Optical Engineering, vol. 28, No. 7, Jul. 1989, pp. 708-716, see entire document.

Ishibashi, S. et al. "Hierarchical Coding Method of Still Pictures with Component Separation", Electronics and Communications in Japan, vol. 70, No. 11, Nov. 1987, pp. 97-109.

Nasrabadi, N. M. et al., "Hierarchical Block Truncation Coding of Digital HDTV Images", IEEE Transactions on Consumer Electronics, vol. 36, No. 3, Aug. 1990, pp. 254-261.

"Digital Picture Processing (Second Edition)", Azriel Rosenfeld and Avinash G. Kak, vol. 1, pp. 116-204 (Compression).

Primary Examiner—Scott A. Rogers
Attorney, Agent, or Firm—Cushman, Darby & Cushman

[57] ABSTRACT

An image compression method which successively diminishes in size the image to form a compressed image. The compression is done by dividing an image into partial areas with equal size, calculating a mean pixel value in each area, and substituting the mean pixel value into the diminished image. The image is then re-enlarged in the same way, and the enlarged image is compared against the original image to determine error values. The error values and the diminished images are used to represent a compressed version of the original image.

3 Claims, 1 Drawing Sheet

IMAGE COMPRESSING METHOD COMPRESSING AN IMAGE INTO A COMPRESSED IMAGE AND ERROR COEFFICIENTS

FIELD OF THE INVENTION

The present invention relates to an image compression method, especially to a method for effective image compression such as for sending image information of TV telecommunication to high speed.

BACKGROUND OF THE INVENTION

DCT is known as an image compressing method. However, its calculation is very complicated. This difficulty in calculation limits the speed—an analog telephone circuit can send an image of a few frames of a second even if a special purpose LSI is used.

SUMMARY OF THE INVENTION

The present invention is invented so as to solve the conventional problems and has a purpose to provide an image compression method for transmitting more image information.

An image compression method according to this invention transmits diminished image of gray scale and at the same time transmits error coefficients in a intermediate stage to enable enlarging a gray scale image from the minimum diminished image into its original size.

PREFERRED EMBODIMENT OF THE PRESENT INVENTION

Figure 1:
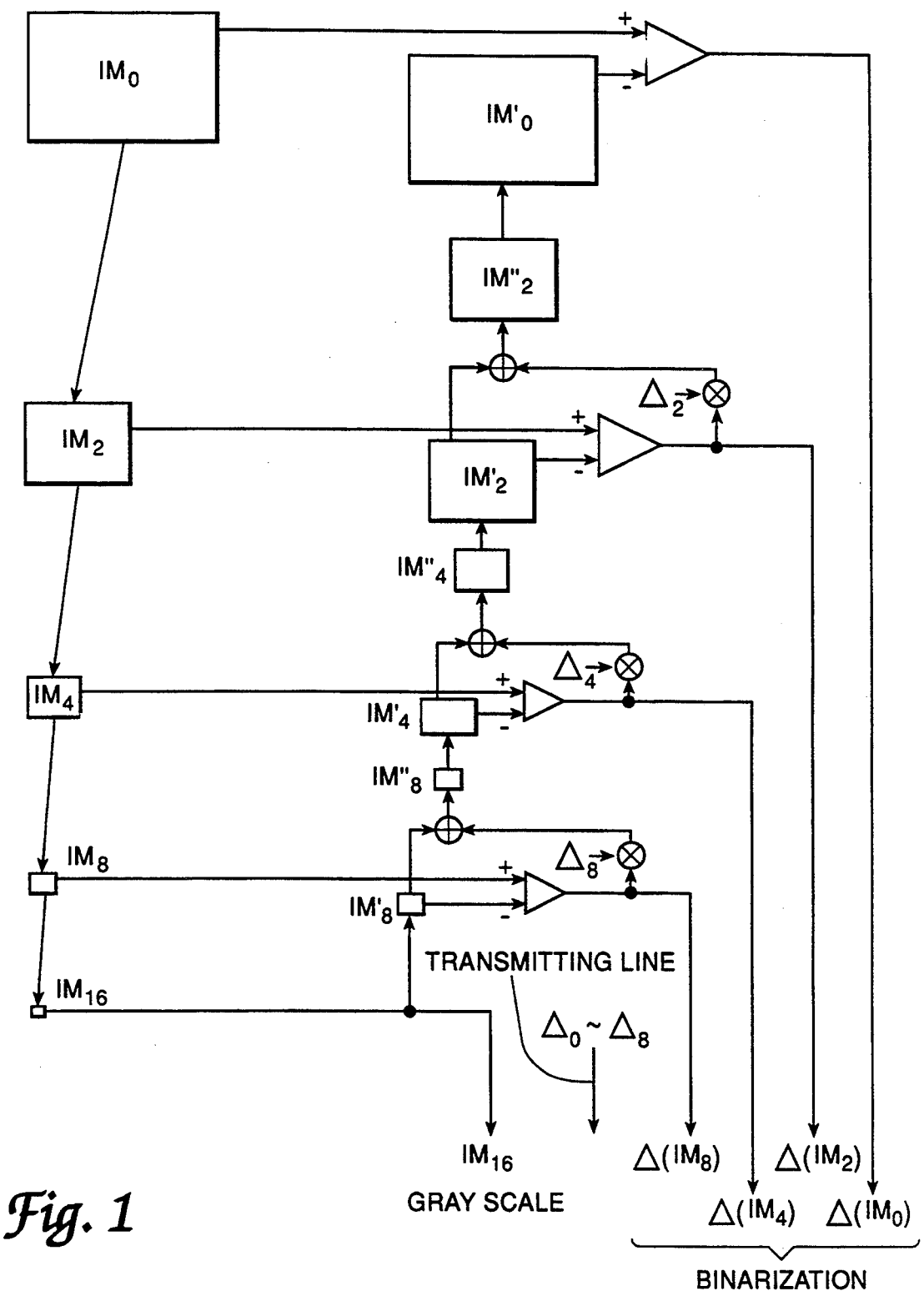
FIG. 1 is a conceptual diagram showing image compression relating to the present invention.

Hereinafter, an embodiment of the present invention is described with reference to the attached drawings.

In FIG. 1, an original image $IM_O$ of gray scale is diminished into ½ step by step by a ratio of length: the gray scale images $IM_2$ (diminution ratio is ½), $IM_4$ (diminution ratio is ¼), $IM_8$ (diminution ratio is ⅛) and $IM_{16}$ (diminution ratio 1/16) are generated.

These gray scale images are generated by representing 2×2 convolution by a pixel of its mean density. These diminished images are described as "phasic diminished image" hereafter. The number of times of phase of diminution is selected suitably. For example, if $IM_0$ has 128×128 pixels, then $IM_{16}$ has 8×8 pixels which is enough to be small. Then it is a final stage. An image of the final stage is described as "The minimum image" hereafter.

Next, starting from the minimum image, error elements for restoring the image to its original state are generated in order.

First, $IM'_8$ is generated by enlarging with interpolation into twice as large as $IM_{16}$. (Such an image is described as "phasic enlarged image".) Enlargement with interpolation is performed by using a well-known method such as recognizing the mean value of adjoining two pixels as the middle pixel. Here, the density of each pixel of $IM'_8$ is subtracted from that of the pixel of $IM_8$ with respect to the corresponding pixel. When the subtracted result is positive, the output is defined as "1". On the other hand, when the subtracted result is negative or 0, the output is defined as "0".

This binary output shows the direction of an error differential (positive or negative) of a phasic enlarged image and a phasic diminished image. The image $\Delta$ ($IM_8$) given the binary data to each pixel is "phasic binary image" hereafter.

A phasic binary image of each enlarged phase after $\Delta$ ($IM_8$) is shown as $\Delta$ ($IM_4$), $\Delta$ ($IM_2$) and $\Delta$ ($IM_0$) in FIG. 1.

At the same time as generating phasic binary image, a coefficient $\Delta 8$ representing the error of a phasic enlarged image corresponding to a phasic diminished image is calculated. This coefficient represents an error and the mean squared error etc., can be adopted. A good result can be obtained using a squared value of the mean value of square root of an error.

A coefficients generating each phasic binary image after coefficient $\Delta 8$ are shown by $\Delta 4$ and $\Delta 2$ in FIG. 1.

At the same time that this coefficient is calculated, an image multiplied a phasic binary image on the coefficient and image added a phasic diminished image are generated. An image generated in such a way in order on each phasic enlargement is called "phasic weighted error image": they are shown by $IM''_8$, $IM''_4$ and $IM''_2$ in FIG. 1. It is possible to suitably select the number of the times of phasic enlargement, however, in the case the sizes of the images on sending and receiving are the same, it will be a final stage because they are the same size as the original image, as phasic expanding image $IM'_8$ has 16×16 pixels, $IM'_4$ has 32×32 pixels, $IM'_2$ has 64×64 pixels and $IM'_0$ has 128×128 pixels.

The present invention is able to send a lot of image information because it sends diminished gray scale images. It is also able to obtain almost the same image as an original image because error coefficients on an intermediate stage in enlarging the gray scale image into the original size.

As mentioned above, according to the present invention, it is possible to send more image information by compressing high speed image information of TV telecommunication in gray scale.

What is claimed is:

1. An image compression method for compressing a gray scale original image with a plurality of pixels comprising the steps of:
   i) diminishing in size said gray scale image step by step so that a plurality of diminished images are generated, and continuing to diminish in size said image until reaching a minimal diminished image representing a final amount of compression by the following steps:
      a) dividing an image to be diminished into a plurality of partial areas with substantially equal size to one another;
      b) calculating a mean pixel value of pixels in each partial area so that each said mean pixel value is defined as a representative pixel value of each said partial area; and
      c) substituting one pixel with said representative pixel value for said pixels of each said partial area;
   ii) enlarging in size the minimal diminished image into said plurality of diminished images step by step, thereby obtaining a plurality of enlarged images corresponding in size to said plurality of diminished images, respectively, but differing in content from said diminished images, by adding one pixel between two adjacent pixels of an image to be enlarged, said one pixel to be added having a pixel value of an average pixel value of said adjacent pixels;

iii) comparing corresponding pixel values of said diminished image and enlarged image to each other to determine a plurality of compared images indicative of differences therebetween, each pixel value of said compared image being a binary value indicating which pixel value of said images is larger than the other;

iv) calculating error coefficients for each enlarged image representing a total error between said pixel value of said enlarged image and said diminished image; and v) representing said gray scale original image by said diminished images, said compared images and said error coefficients.

2. An image compression method as claimed in claim 1, wherein said error coefficient is calculated by averaging square root of said differences of said pixel values.

3. A method of compressing images into components, comprising the steps of:

a) obtaining an original image;

b) compressing a predetermined area of said image into a reduced predetermined area;

c) taking another area of a decreased image formed by a plurality of reduced predetermined areas and compressing said another area into another reduced predetermined area;

d) repeating said step c) until obtaining a minimized image of a desired reduction;

e) enlarging said minimized image to form a first enlarged image of a same size as one of said decreased images;

f) comparing said first enlarged image with said one decreased image to determine an error therebetween, and producing values indicative of the error;

g) repeating steps e) and f) until obtaining an enlarged image which is the same size as said original image; and h) outputting said minimized image and said values indicative of the error as compressed image information.

* * * * *